US008751117B2

(12) United States Patent
Ekvall et al.

(10) Patent No.: US 8,751,117 B2
(45) Date of Patent: Jun. 10, 2014

(54) METHOD FOR CONTROLLING A MOVEMENT OF A VEHICLE COMPONENT

(71) Applicant: Volvo Construction Equipment AB, Eskilstuna (SE)

(72) Inventors: Andreas Ekvall, Hallstahammar (SE); Bo Vigholm, Stora Sundby (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 13/932,279

(22) Filed: Jul. 1, 2013

(65) Prior Publication Data

US 2013/0297155 A1 Nov. 7, 2013

Related U.S. Application Data

(62) Division of application No. 12/162,348, filed as application No. PCT/SE2006/000125 on Jan. 26, 2006.

(51) Int. Cl.
*G06F 19/00* (2011.01)
*G06G 7/66* (2006.01)

(52) U.S. Cl.
USPC .................. 701/50; 701/52; 701/53; 701/124

(58) Field of Classification Search
USPC ........................................ 701/50, 52, 53, 124
See application file for complete search history.

(56) References Cited

U.S. PATENT DOCUMENTS

| | | | | |
|---|---|---|---|---|
| 2007/0168100 | A1* | 7/2007 | Danko | 701/50 |
| 2007/0225896 | A1* | 9/2007 | Steimel | 701/124 |
| 2008/0005938 | A1* | 1/2008 | Aebischer et al. | 37/413 |
| 2008/0065298 | A1* | 3/2008 | Kawaguchi | 701/50 |
| 2008/0082239 | A1* | 4/2008 | Anderson | 701/50 |
| 2008/0199294 | A1* | 8/2008 | Sahlin et al. | 414/694 |
| 2008/0201043 | A1* | 8/2008 | Sahlin et al. | 701/50 |
| 2008/0210505 | A1* | 9/2008 | Vigholm | 188/266.2 |
| 2008/0234901 | A1* | 9/2008 | Johnson et al. | 701/50 |
| 2008/0255735 | A1* | 10/2008 | Marathe et al. | 701/50 |
| 2009/0018728 | A1* | 1/2009 | Sahlin et al. | 701/50 |
| 2009/0018729 | A1* | 1/2009 | Sahlin et al. | 701/50 |
| 2009/0043462 | A1* | 2/2009 | Stratton et al. | 701/50 |
| 2009/0093934 | A1* | 4/2009 | Hanson | 701/50 |
| 2010/0063682 | A1* | 3/2010 | Akaki | 701/42 |
| 2010/0152981 | A1* | 6/2010 | Nishi et al. | 701/50 |

* cited by examiner

*Primary Examiner* — Khoi Tran
*Assistant Examiner* — Jorge Peche
(74) *Attorney, Agent, or Firm* — WRB-IP LLP

(57) ABSTRACT

A method is provided for controlling movement of a first vehicle component relative to a second vehicle component, including the steps of determining a deceleration rate of the first vehicle component in order to achieve a predetermined final speed at a final position, determining a starting position for initiating the deceleration on the basis of the predetermined final speed, the final position and the determined deceleration rate and controlling deceleration of the component from the starting position to the final position according to the determined acceleration rate.

23 Claims, 3 Drawing Sheets

METHOD FOR CONTROLLING A MOVEMENT OF A VEHICLE COMPONENT

The present application is a divisional of U.S. application Ser. No. 12/162,348, filed Jul. 26, 2008, which was the U.S. national stage of International Application No. PCT/SE2006/000125, filed Jan. 26, 2006, both of which are incorporated by reference.

BACKGROUND AND SUMMARY

The present invention relates to a method for controlling movement of a first vehicle component relative to a second vehicle component. The invention is especially applicable for a work vehicle.

The term work vehicle comprises different types of material or earth handling vehicles like construction machines, such as a wheel loader, a backhoe loader and an excavator. The invention will be described below in a case in which it is applied in a wheel loader. This is to be regarded only as an example of a preferred application.

Work vehicles are for example utilized for construction and excavation work. A wheel loader may be used to transport heavy loads from one location to another, often encountering a series of turns and varying grade slopes on the route between two or more locations.

The method may be used for controlling movement of a work implement capable of being moved through a number of positions during a work cycle. Such implements typically include buckets, forks, and other material handling apparatus. The typical work cycle associated with a bucket includes sequentially positioning the bucket and associated lift arm in a digging position for filling the bucket with material, a carrying position, a raised position, and a dumping position for removing material from the bucket.

Control levers are mounted at an operator's station and are connected to an electrohydraulic circuit for moving the bucket and/or lift arms. The operator manually move the control levers to open and close hydraulic valves that direct pressurized fluid to hydraulic cylinders which in turn cause the work implement to move. For example, when the lift arms are to be raised, the operator moves the control lever associated with the lift arm hydraulic circuit to a position at which a hydraulic valve causes pressurized fluid to flow to the head end of a lift cylinder, thus causing the lift arms to rise. When the control lever returns to a neutral position, the hydraulic valve closes and pressurized fluid no longer flows to the lift cylinder.

In normal operation, the work implement is often abruptly started or brought to an abrupt stop after performing a desired work cycle function, which results in rapid changes in velocity and acceleration of the bucket and/or lift arm, vehicle, and operator. This can occur, for example, when the implement is moved to the end of its desired range of motion and can produce operator discomfort as a result of the rapid changes in velocity and acceleration.

U.S. Pat. No. 6,047,228 discloses a method for limiting the control of an implement of a work machine. A controller receives an implement position signal from an implement position sensor and an operator command signal from an operator joystick sensor. The controller comprises a plurality of look-up tables, which correspond to the work functions used to control the implement. The lookup tables are used to determine a magnitude of an electrical valve signal to a valve, which controls the implement via hydraulic cylinders. The magnitude of the electrical valve signal is determined by comparing a predetermined maximum limit value from a look-up table with the magnitude of the operator command signal and selecting the lesser value. This results in a reduction in the maximum velocity (of the work implement movement) that the operator may command. The limiting values are for example chosen to stop a pivotal movement of the implement prior to the implement reaching the physical maximum dump angle. This results in that the dampening always starts at the same point and the valve follows a predefined line to a fixed value regardless of the current implement load and relative velocity. This leads to variations in the deceleration and the forces on the cab will vary arbitrarily.

It is desirable to achieve a control method which increases operator comfort during operation of the vehicle. An aspect of the invention is especially directed to a control method that creates conditions for achieving a determined accepted force on a second vehicle component during acceleration/deceleration of a first vehicle component. Specifically, the second vehicle component comprises a vehicle frame and the first vehicle component comprises a work implement.

A method according to an aspect of the present invention comprises the steps of determining a deceleration rate of the first vehicle component in order to achieve a predetermined final speed at a final position, determining a starting position for initiating the deceleration on the basis of the predetermined final speed, the final position and the determined deceleration rate and controlling deceleration of the first vehicle component from the starting position to the final position according to the determined deceleration rate.

According to one embodiment of the invention, the method is applied for end dampening of a work implement. Thus, the final position may represent a geometrical or a mechanical end position or be in the vicinity of the end position and the final speed at the final position is zero or close to zero.

According to a further embodiment of the invention, the method comprises the step of detecting a vehicle operation parameter before initiating the deceleration and determining the starting position also on the basis of the detected vehicle operation parameter. Especially, a speed of the first vehicle component relative to the second vehicle component is detected. Preferably, the detected operation parameter is indicative of an angular speed of the first vehicle component. Thus, the starting point for initiating the controlled deceleration varies for different detected operative conditions. This creates further conditions for achieving a predetermined force on the second vehicle component regardless of the magnitude of the detected vehicle operation parameter.

According to a further embodiment of the invention, the method comprises the step of detecting a vehicle operation parameter and calculating a deceleration rate as a function of the detected vehicle operation parameter. Especially, a load is detected. Preferably, a pressure in a vehicle hydraulic system is detected, wherein the hydraulic system is adapted to move the first vehicle component relative to the second vehicle component and the detected hydraulic pressure represents the load.

Thus, the starting point for initiating the controlled deceleration is based on both the angular speed of the first vehicle component and the load.

According to a further development of the last mentioned embodiment, the deceleration rate has an inverse relationship to the detected load. The force (F) subjected to the second vehicle component equals the load, or weight, (m) multiplied by the acceleration (or deceleration) (a). By using the inverse relationship, the deceleration may be controlled so that the second vehicle component is subjected to the same force regardless of the magnitude of the detected load.

According to an alternative to the last mentioned embodiment, the method comprises the step of using a predetermined deceleration rate. Thus, this predetermined deceleration rate may be independent from the load. In other words, the magnitude of the load is estimated, and the starting position will be dependent on the initial first vehicle component relative speed.

It is also desirable to achieve a determined accepted force on a second vehicle component during positive acceleration of a first vehicle component, such as a work implement, i.e. during a motion starting procedure. The term "positive acceleration" has the meaning of a speed increase. The second vehicle component may be formed by a vehicle frame.

A method according to an aspect of the present invention comprises the steps of determining an acceleration rate in order to achieve an increased, predetermined final speed at a final position, and controlling acceleration of the first vehicle component from a starting position to the final position according to the determined acceleration rate.

A method according to an aspect of the present invention comprises the steps of determining an accepted force on the second vehicle component, which force during operation results from an acceleration movement of the first vehicle component, determining a magnitude of an acceleration rate of the first vehicle component such that the accepted force on the second vehicle component is not exceeded and controlling acceleration of the first vehicle component according to the determined acceleration rate. The term "acceleration" here has the meaning of either a positive acceleration, i.e. speed increase or a negative acceleration, i.e. speed decrease. In other words, a negative acceleration is a deceleration or retardation.

According to one embodiment, the determined accepted force on the second vehicle component from said acceleration movement is substantially the same regardless of the magnitude of any load exerted on the first vehicle component and the magnitude of any relative speed of the first vehicle component before initiation of the acceleration.

Further preferred embodiments and advantages will be apparent from the following description and drawings.

BRIEF DESCRIPTION OF THE DRAWINGS

The invention will be explained below, with reference to the embodiments shown on the appended drawings, wherein FIG. 1 schematically shows a wheel loader in a side view.

DETAILED DESCRIPTION

Figure 1:
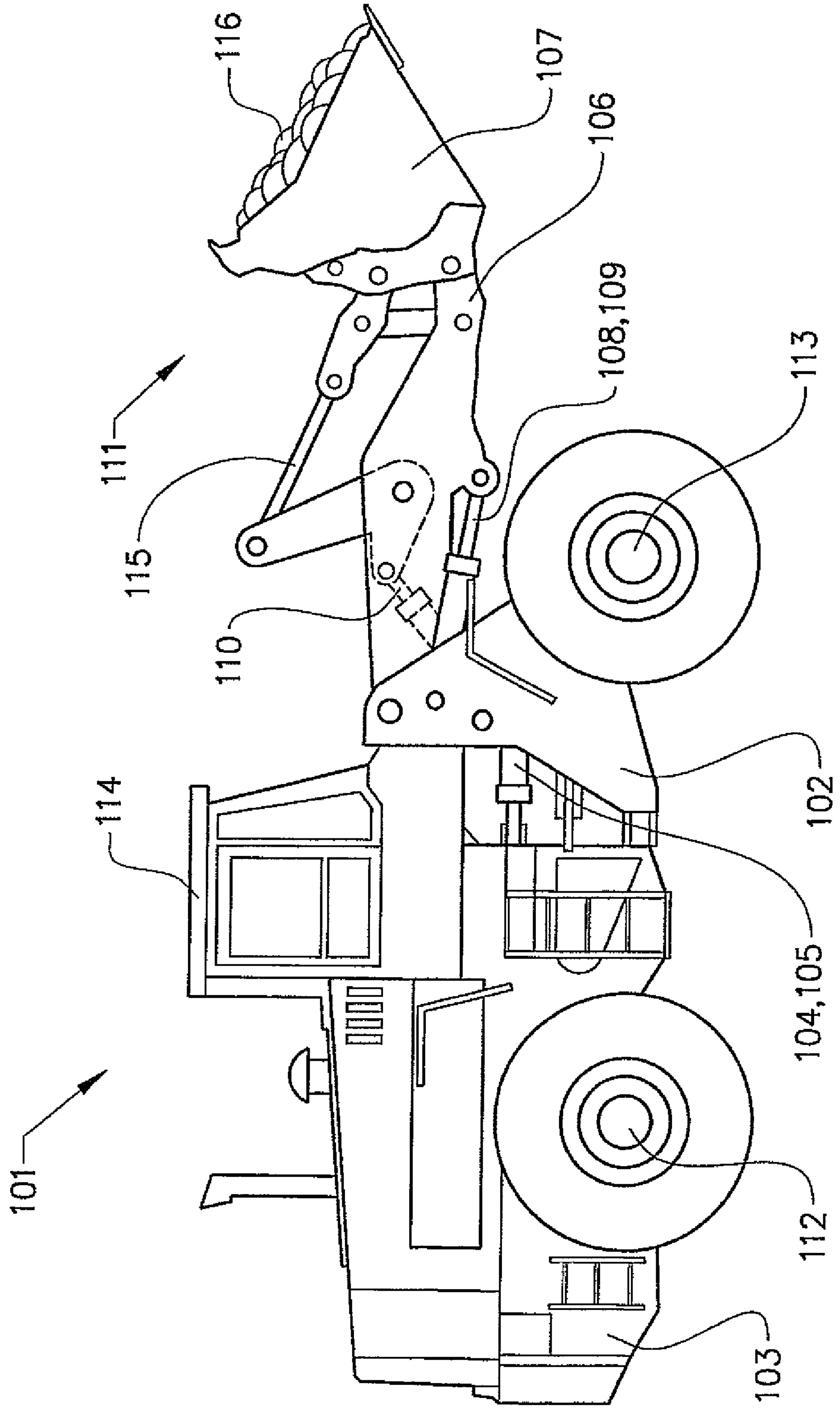

FIG. 1 shows a wheel loader 101. The body of the wheel loader 101 comprises a front body section 102 with a front frame, and a rear body section 103 with a rear frame, which sections each has a pair of half shafts 112,113. The rear body section 103 comprises a cab 114. The body sections 102,103 are connected to each other via an articulation joint in such a way that they can pivot in relation to each other around a vertical axis. The pivoting motion is achieved by means of two first actuators in the form of hydraulic cylinders 104,105 arranged between the two sections. Thus, the wheel loader is an articulated work vehicle. The hydraulic cylinders 104,105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit, or boom, 106 and a work implement 107, or payload carrier, in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108,109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

Figure 2:
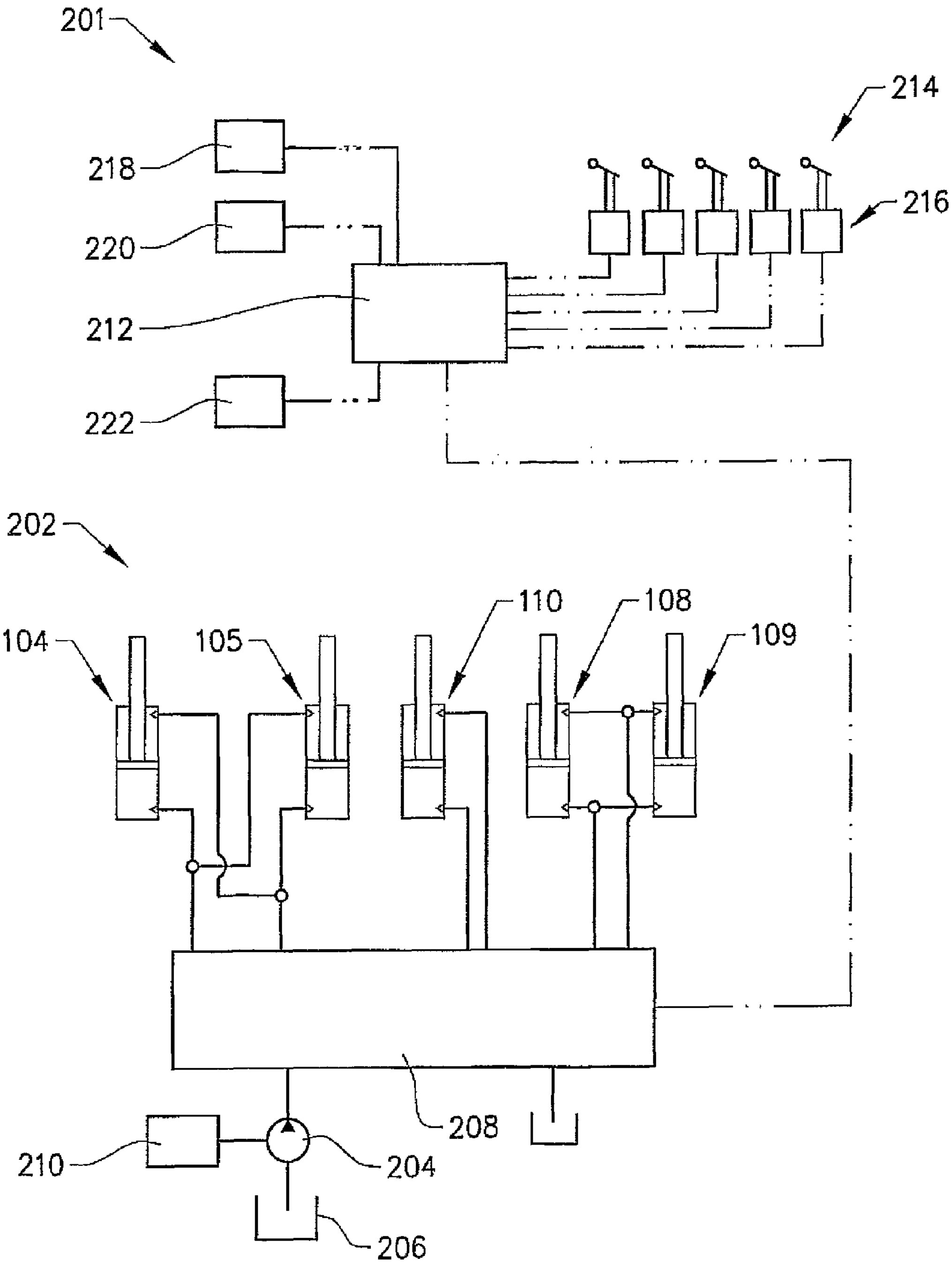
FIG. 2 shows one embodiment of a vehicle system for controlling movement of the wheel loader.

FIG. 2 shows one embodiment of an arrangement 201 for controlling movements of the wheel loader 101. The solid lines indicate main hydraulic conduits, the lines with a longer dash followed by two dots indicate lines for electric signals.

The control arrangement 201 comprises a hydraulic system 202 comprising a pump 204 adapted to provide the hydraulic cylinders 104,105,108,109,110 with pressurized hydraulic fluid from a container 206. A valve means 208 is operatively connected between the pump 204 and the hydraulic cylinders. A power source, preferably an internal combustion engine, in the form of a diesel engine, 210 is operatively connected to the pump 204 for driving the pump. The engine 210 is further adapted for propelling the vehicle 101 via a powertrain (not shown).

The control arrangement 201 further comprises a control unit, or computer 212. A number of electric operator controlled elements 214 are arranged at an operator station in the cab 114 for controlling the vehicle. The operator controlled elements 214 are formed by operating levers and connected to the control unit 212. The control levers 214 control the lifting operation of the boom 106, the tilting operation of the bucket 107, and the steering operation.

A control lever position sensor 216 senses the position of the respective control lever 214 and responsively generates an electrical operator command signal. The electrical signal is delivered to an input of the control unit 212. The control lever position sensor 216 preferably includes a rotary potentiometer which produces a pulse width modulated signal in response to the pivotal position of the control lever, however, any sensor that is capable of producing a signal in response to the pivotal position of the control lever would be operable with the instant invention. For example, the potentiometers could be replaced with radio frequency (RF) sensors disposed within the hydraulic cylinders.

A boom position sensor 218 senses the elevational position of the boom 106 with respect to the vehicle frame and responsively repeatedly produces boom position signals. The control unit 212 receives the boom position signals and determines the boom lifting speed or the boom lowering speed.

A work implement position sensor 220 senses the pivotal position of the work implement 107 with respect to the boom 106 and responsively repeatedly produces work implement position signals. The control unit 212 receives the work implement position signals and determines the work implement tilting speed and direction.

In one embodiment, the boom and work implement position sensors 218,220 include rotary potentiometers. The rotary potentiometers produce pulse width modulated signals in response to the angular position of the boom 106 with respect to the vehicle frame and the bucket 107 with respect to the boom 106. The angular position of the boom is a function of the lift cylinder extension 108,109, while the angular position of the bucket 107 is a function of both the tilt and lift cylinder extensions 110,108,109. The sensors 218,220 can readily be any other sensor which is capable of measuring, either directly or indirectly, the relative extension of a hydraulic cylinder. For example, the potentiometers could be replaced with radio frequency (RF) sensors disposed within the hydraulic cylinders.

A load sensor 222 senses the load carried by the work implement 107. According to one embodiment, the load sensor senses a pressure in the hydraulic system 202, which pressure represents the load. The pressure sensor 222 is electrically coupled to the control unit 212. The pressure sensor 222 senses a circuit pressure or a load applied to the corresponding hydraulic cylinder 104,105,108,109,110. In one example, the pressure sensor 222 may be strain gauges or any other load determining sensors. The pressure sensor 222 can be placed at any location suitable to determine a load on the hydraulic cylinders. One skilled in the art will appreciate that any other sensor capable of ascertaining a load on a hydraulic actuator may be utilized.

The valve means 208 comprises a plurality of electro-hydraulic valves. Each of the electro-hydraulic valves is responsive to electrical signals produced by the control unit 212 and accordingly provides hydraulic fluid flow to the associated hydraulic cylinder (s). The valve actuator may be a solenoid actuator or any other actuator known to a man skilled in the art.

The control unit 212 may store mathematical functions or equations that provide a desired operating parameter value (output) based on the boom and/or bucket speed, moving direction, and load on the work implement. Each function or equation may define the operating parameter or moving rate as a function of the inputs. Thus, the control unit 212 receives information as to, for example, the position of the boom and the bucket, and determines the speed of the boom and the bucket, in which direction it is moving, and the magnitude of the load carried by the bucket and then determines an appropriate acceleration/deceleration rate of the hydraulic cylinder(s).

One embodiment of a method for controlling movement of the work implement 107 relative to the vehicle frame will be described below with reference to FIG. 3. More specifically, an end dampening method will be described during a tilting operation of the bucket. Thus, the work implement 107 is decelerated from an initial speed to zero or close to zero. The movement is controlled so that the magnitude of a predetermined, accepted force resulting from the end dampening and effecting the vehicle frame (and thereby the cab 114 and the operator) will be the same regardless of the initial work implement speed and the work implement load. Twice the load (m) requires half the deceleration (a) in order to get the same magnitude of the force (F) according to the formula $F=m*a$.

Figure 3:
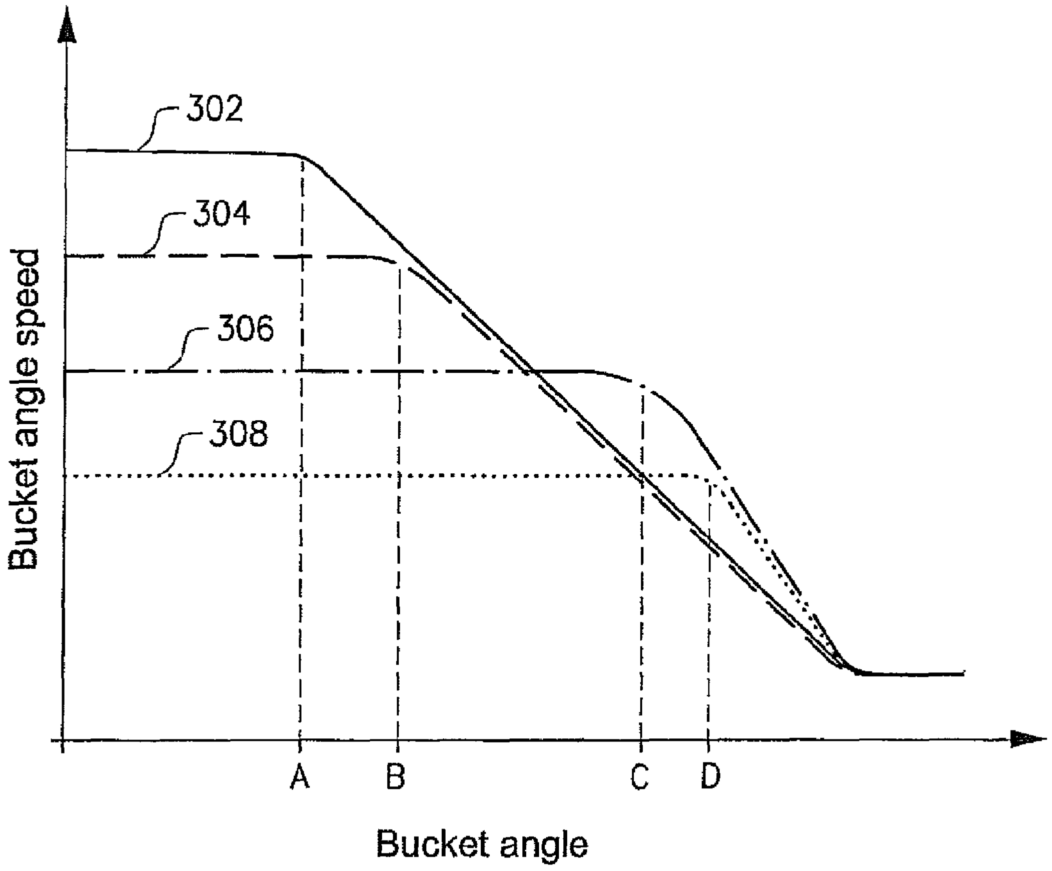
FIG. 3 is a graph representing one embodiment of the invention.

FIG. 3 is a graph representing one embodiment of the invention. Four lines 302, 304, 306, 308 are shown in the graph representing different initial bucket angle speeds. The solid line 302 and the dashed line 304 indicate a dampening method for dampening the movement of a load of 2m. The line 306 with a longer dash followed by a dot and the dotted line 308 indicate a dampening method for dampening the movement of a load of m. The deceleration rate of the larger load of 2m is according to the formula $F=m*a$ half the deceleration rate of the smaller load m. A substantially constant deceleration is used during the movement control. Further, the start and stop of the dampening procedure are smooth to avoid peaks in the deceleration which may be felt in the cab.

Further, a higher initial bucket angle speed will result in an earlier starting point for the deceleration, see points A, B, C, D for the four lines 302, 304, 306, 308 in FIG. 3.

According to one embodiment, the deceleration method comprises a first step of determining if end dampening is required. This step is performed in that the control unit 212 receives signals from the position sensors 218,220 and determines that the bucket approaches the end position, wherein end dampening is required.

A final position of the deceleration method is predetermined to be a desired maximum dumping or lifting or lowering angle, such as a mechanical end, or a geometrical limitation of the movement pattern of the work implement or an end position of the hydraulic cylinder, or close to such end position. Thus, the method provide for a velocity limiting effect when the tilt (or lift) cylinder approaches an extreme kinematic gain region near the desired maximum angle; thereby, reducing the "jerk" felt by the operator and reducing the forces within the cylinders. Further, a final speed at the final position is predefined to be zero.

For example, regarding dumping, the method is adapted to stop the pivotal movement of the bucket prior to the bucket reaching the physical maximum dump angle. Consequently, the bucket movement can stop prior to engaging the mechanical stops (which are associated with infinite kinematic gains) in order to provide for structural protection of the work implement.

Next, a load subjected to the work implement is detected. This is preferably done by detecting a pressure in the vehicle hydraulic system 202, which represents the work implement load. A deceleration rate is calculated as a function of the detected load so that zero speed or close to zero speed will be achieved at the final position. More specifically, the magnitude of the deceleration rate is determined such that the accepted force on the vehicle frame from said deceleration movement is substantially the same regardless of the magnitude of the load and the magnitude of the relative speed of the work implement before initiation of the deceleration.

Thereafter, a starting position for initiating the deceleration is determined on the basis of that the final speed should be zero or close to zero at the final position and the calculated deceleration rate. The deceleration of the work implement from the starting position to the final position is thereafter performed starting from the determined starting position, according to the determined deceleration rate. More specifically, a moving rate of a valve associated with the hydraulic actuator controlling the specific work implement movement is calculated and the valve movement is controlled accordingly.

According to one embodiment, which is a further development of the last mentioned embodiment, the control unit will control the valve position in the dampening area to be the least of the operator input and the result of the dampening algorithm.

Further, according to a further embodiment, the control method is used for dampening the motion when the boom 106 is lowered towards the ground. This is commonly referred to as a Return To Dig function (RTD).

Further, according to a further embodiment, the control method is used for dampening the motion when the boom 106 is lifted upwards towards its maximum elevated position.

Further, according to a further embodiment, the control method is used for dampening any of the boom and bucket motions when an operator accidentally releases the associated lever during operation. The lever is then automatically returned to a neutral position. However, it is necessary to brake the motion of the boom or bucket to a stop.

According to a further embodiment, a method is provided for controlling an acceleration of a first vehicle component, such as the work implement, relative to a vehicle frame. The method comprises the step of determining a positive acceleration rate in order to achieve an increased, predetermined final speed at a final position.

First, a starting position for initiating the acceleration is determined. The starting position is for example a mechanical or geometrical end position. However, it may also be a position for example halfway between two end positions. A vehicle operation parameter, preferably the relative speed of the bucket, is detected before initiating the acceleration. The initial acceleration rate is normally close to zero at the end position. Further, a load subjected to the work implement is detected. The acceleration rate is determined on the basis of the detected load. More specifically, the acceleration rate is calculated as a function of the detected load.

More specifically, the magnitude of the acceleration rate is determined such that a force on the vehicle frame from said acceleration movement is substantially the same regardless of the magnitude of any load exerted on the work implement and the magnitude of the relative speed of the work implement before initiation of the acceleration.

Next, the acceleration of the work implement from the starting position to the final position is controlled according to the determined acceleration rate.

The present invention additionally provides for a "smooth starting" function during for example gravity assisted operations, e.g., when the boom 106 is being lowered. The function is chosen to gradually increase the velocity limit of the boom 106 as the boom is lowered from its desired maximum height. Thus, as the boom 106 is lowered from its maximum height, the electrical valve signal magnitude proportionally increases. This provides for greater controllability of the lowering function by preventing "jerky" operation.

According to one embodiment, the sensors for sensing the position of the boom and the bucket may be arranged to sense the position of the piston of the hydraulic cylinder associated with the implement movement. The position sensors may further include Hall effect sensors, resolvers, tachometers, or the like.

In one exemplary embodiment, the control unit 212 may be preprogrammed with a map or table that contains operating parameter values for inputs, such as the boom and bucket position, speed and direction of the actuator, and load on the actuator. Such a map or table may be created prior to the operation of the vehicle 101, for example, during either a test run of the hydraulic system 202 or a lab test, and may be prestored in a memory located in the control unit 212. Based on the inputs, a deceleration rate (or acceleration rate) is selected and the starting point is thereafter determined.

Further, the moving direction of the hydraulic cylinders may be considered to achieve a desired acceleration or deceleration of the cylinders. For instance, one may wish to have a slower acceleration or deceleration of the hydraulic actuator when it is extended to raise the load in the bucket and have a faster acceleration or deceleration when it is retracted to lower the empty bucket.

The controller 212 comprises a memory, which in turn comprises a computer program with computer program segments, or a program code, for implementing the control method when the program is run. This computer program can be transmitted to the controller in various ways via a transmission signal, for example by downloading from another computer, via wire and/or wirelessly, or by installation in a memory circuit. In particular, the transmission signal can be transmitted via the Internet.

The invention also relates to a computer program product comprising computer program segments stored on a computer-readable means for implementing the control method when the program is run. The computer program product can consist of or comprise, for example, a diskette.

Thus, while the present invention has been particularly shown and described with reference to the preferred embodiment above, it will be understood by those skilled in the art that various additional embodiments may be contemplated without departing from the scope of the following claims.

According to one alternative embodiment, the accepted force on the vehicle frame is determined such that it varies for different operation states. The magnitude of the deceleration rate is determined on the basis of the determined allowed force. The accepted force may be predetermined to different set values for different operation states. For example, an operation parameter is detected during operation and the allowed force on the vehicle frame is determined on the basis of the detected operation parameter. The operation parameter may represent a vertical position of the work implement and/or a load subjected to the work implement. According to one example, a higher force is allowed for a lower vertical position of the work implement. According to a further example, a higher force may be accepted for a higher load.

According to one further alternative embodiment, a final speed at the final position during the end dampening is different from zero. In this way, conditions are created for reaching the end position also when the equipment is worn. Alternatively, the final position is continuously calibrated to be correct.

According to one further alternative embodiment, the final speed at the final position during the end dampening is determined on the basis of the determined load. A higher final position is accepted when the load is small.

The control method is applicable for all type of speed changes in any hydraulic function, from one speed to another. Thus, the speed change does not have to be negative (dampening). Instead the control method may be used for both positive and negative speed changes.

According to one alternative, the position sensor for the boom and/or the bucket is adapted to directly provide an angular speed signal to the control unit. The angular speed used for calculating the deceleration rate or acceleration rate may be set as an average of a plurality of sensor signals.

According to a further alternative, the position of the control lever associated with a specific work function, such as lifting or dumping is determined for an indication of the load. The acceleration or deceleration rate is calculated via approximations on the basis of the detected control lever position and the work implement speed. Further, as an alternative to detecting the position of the control lever, the position of a slide in a control valve for the movement may be detected and used indicative of the load for said calculations.

According to a further alternative, a torque input to the pump is detected indicative of the load. For example, an output torque from the internal combustion engine may be determined during a lifting operation.

This gives an indication of the pump characteristics. Further, an electric motor may be used for driving the pump. An output torque from the electric motor during operation is indicative of the load.

Further operation parameters may be detected and used as complementary inputs to determine the deceleration rate or acceleration rate.

The term "second vehicle component" may, as an alternative to the vehicle frame, be constituted by the lift arm, or vehicle cab or other vehicle component.

The term "load" is not limited to the external load, in the form of objects or material, subjected to the first vehicle component, but may comprise the total load from the work implement and the external load, and possibly also comprising the load of the lift arm.

Further, as an alternative, pressures may be detected at a plurality of positions in the hydraulic system for achieving a value of the load. For example, a combination of the pressures from both lift and tilt is used to determine a value of the total load depending on the geometry of the load-arm unit.

The invention may be used for controlling movement of other vehicle components than a work implement. For example, the steering of an articulated vehicle by means of hydraulic cylinders (see cylinders 104,105 in FIGS. 1 and 2) may be controlled by means of the inventive method. The term "first vehicle component" is in this case constituted by the front body section 102 and the term "second vehicle component" is constituted by the rear body section 103.

Further, the invention may for example be used for an excavator. An excavator normally has a lower vehicle part, comprising a lower frame, a vehicle powertrain and ground engaging members, such as tracks or wheels. The excavator further has an upper vehicle part, or housing, comprising an upper frame and an operator cab. The upper vehicle part is rotationally connected to the lower vehicle part around a vertical axis. The invention may be used for controlling deceleration and/or acceleration of the upper vehicle part with regard to the lower vehicle part.

Further, the invention may for example be used for a work vehicle designed for use in the forest. The method may be used for controlling movements of a crane, or boom, or a work implement for cutting logs and/or removing branches/twigs from logs.

The invention claimed is:

1. A method for controlling a movement of a first vehicle component relative to a connected second vehicle component, comprising determining, using a control unit, an acceleration rate of the first vehicle component relative to the second vehicle component required in order to achieve, relative to a starting speed at a starting position of the first vehicle component relative to the second vehicle component, an increased, predetermined final speed at a final position of the first vehicle component relative to the second vehicle component, and controlling acceleration of the first vehicle component relative to the second vehicle component from the starting position to the final position according to the determined acceleration rate.

2. A method according to claim 1, comprising determining a starting position for initiating the acceleration.

3. A method according to claim 1, detecting a vehicle operation parameter before initiating the acceleration and determining the acceleration rate based on the detected vehicle operation parameter.

4. A method according to claim 1, detecting a speed of the first vehicle component relative to the second vehicle component before initiating the acceleration and determining the acceleration rate also based on the detected first vehicle component speed.

5. A method according to claim 1, comprising detecting a load and calculating the acceleration rate as a function of the detected load.

6. A method according to claim 5, comprising detecting a pressure in a vehicle hydraulic system, wherein the hydraulic system is adapted to move the first vehicle component relative to the second vehicle component and the detected hydraulic pressure represents the load.

7. A method according to claim 5 wherein the acceleration rate has an inverse relationship to the detected load.

8. A method according to claim 1, wherein the final speed at the final position is substantially larger than an initial speed at the starting position.

9. A method according to claim 1, wherein the initial speed at the starting position is zero or close to zero.

10. A method according to claim 1, comprising determining an accepted force level on the second vehicle component and determining a magnitude of the acceleration based on the determined accepted force.

11. A method according to claim 10, comprising detecting an operation parameter and determining the accepted force on the second vehicle component based on the detected operation parameter.

12. A method according to claim 11, wherein the operation parameter represents a position of the work implement.

13. A method according to claim 11, wherein the operation parameter represents a load.

14. A method according to claim 1, wherein the magnitude of the acceleration is determined such that a force on the second vehicle component from said acceleration movement is substantially the same regardless of the magnitude of any load exerted on the first vehicle component and the magnitude of the relative speed of the first vehicle component before initiation of the acceleration.

15. A method for controlling movement of a first vehicle component relative to a connected second vehicle component, comprising determining, using a control unit, an accepted force level on the second vehicle component, the accepted force being a force resulting from an acceleration movement of the first vehicle component relative to the second vehicle component, determining a magnitude of an acceleration rate of the first vehicle component relative to the second vehicle component such that the accepted force level on the first vehicle component is not exceeded, and controlling acceleration of the first vehicle component relative to the second vehicle component according to the determined acceleration.

16. A method according to claim 15, wherein the determined accepted force level on the second vehicle component from said acceleration movement is substantially the same regardless of a magnitude of any load exerted on the first vehicle component and a magnitude of any speed of the first vehicle component relative to the second vehicle component before initiation of the acceleration.

17. A method according to claim 15, wherein the first vehicle component is adapted to perform movement along an angular path with regard to the second vehicle component.

18. A method according to claim 15, wherein the first vehicle component constitutes a work implement.

19. A method according to claim 18, wherein the work implement is tiltably arranged on the boom and the controlled movement constitutes a tilting motion of the work implement.

20. A method according to claim 15, wherein the vehicle comprises a boom, which is movably arranged relative to the second vehicle component, and the controlled movement constitutes a lifting or lowering motion of the boom.

21. A method according to claim 15, wherein the first vehicle component comprises a forward vehicle frame and the second vehicle component comprises a rear vehicle frame, wherein frame-steering of the vehicle is controlled.

22. A method according to claim 15, wherein the movement of the first vehicle component relative to the second vehicle component is hydraulically controlled.

23. A method according to claim 15, wherein the second vehicle component is constituted by a vehicle frame.

* * * * *